US010000040B2

(12) United States Patent
Meirlaen et al.

(10) Patent No.: US 10,000,040 B2
(45) Date of Patent: Jun. 19, 2018

(54) FLOOR PANEL, METHODS FOR MANUFACTURING LAMINATE PANELS AND METHOD FOR TREATING MATERIAL SHEETS APPLIED HEREWITH

(71) Applicant: FLOORING INDUSTRIES LIMITED, SARL, Bertrange (LU)

(72) Inventors: Jose Meirlaen, Deinze (BE); Christof Vandevoorde, Zulte (BE)

(73) Assignee: FLOORING INDUSTRIES LIMITED, SARL, Bertrange (LU)

(*) Notice: Subject to any disclaimer, the term of this patent is extended or adjusted under 35 U.S.C. 154(b) by 0 days. days.

(21) Appl. No.: 15/155,208

(22) Filed: May 16, 2016

(65) Prior Publication Data
US 2016/0257096 A1 Sep. 8, 2016

Related U.S. Application Data

(63) Continuation of application No. 13/146,070, filed as application No. PCT/IB2010/050268 on Jan. 21, 2010, now Pat. No. 9,366,034.

(30) Foreign Application Priority Data

Jan. 26, 2009 (BE) .................................. 2009/0039

(51) Int. Cl.
B32B 21/02 (2006.01)
B29C 65/20 (2006.01)
(Continued)

(52) U.S. Cl.
CPC .............. B32B 21/02 (2013.01); B29C 65/20 (2013.01); B32B 21/06 (2013.01); B32B 21/14 (2013.01);
(Continued)

(58) Field of Classification Search
CPC ....................................................... E04F 15/00
See application file for complete search history.

(56) References Cited

U.S. PATENT DOCUMENTS 4,006,048 A 2/1977 Cannady, Jr. et al.
6,569,510 B1 5/2003 Menon et al.
(Continued)

FOREIGN PATENT DOCUMENTS

DE 19944399 A1 4/2001
DE 102005051756 A1 5/2007
(Continued)

OTHER PUBLICATIONS

International Search Report and Written Opinion in in PCT/IB2010/050268, dated Sep. 24, 2010.
(Continued)

Primary Examiner — Timothy Kennedy
(74) Attorney, Agent, or Firm — Workman Nydegger

(57) ABSTRACT

Floor panel of the type substantially consisting of a substrate and a top layer provided-thereon based on synthetic material. The top layer includes a printed decor and one or more material sheets provided with synthetic material. The floor panel also includes a balancing layer at the underside of the substrate, the balancing layer containing a synthetic material layer which is free from material sheets. Methods used to make the panels are disclosed.

17 Claims, 3 Drawing Sheets

(51) Int. Cl.

| | |
|---|---|
| *B32B 27/08* | (2006.01) |
| *E04F 15/00* | (2006.01) |
| *B32B 27/42* | (2006.01) |
| *B32B 21/06* | (2006.01) |
| *B32B 37/10* | (2006.01) |
| *E04F 15/02* | (2006.01) |
| *B32B 21/14* | (2006.01) |
| *E04F 15/10* | (2006.01) |
| *B32B 38/00* | (2006.01) |

(52) U.S. Cl.
CPC ............ *B32B 27/08* (2013.01); *B32B 27/42* (2013.01); *B32B 37/10* (2013.01); *E04F 15/00* (2013.01); *E04F 15/02* (2013.01); *E04F 15/102* (2013.01); *E04F 15/107* (2013.01); *B32B 38/145* (2013.01); *B32B 2255/08* (2013.01); *B32B 2255/26* (2013.01); *B32B 2270/00* (2013.01); *B32B 2305/022* (2013.01); *B32B 2307/21* (2013.01); *B32B 2307/402* (2013.01); *B32B 2307/412* (2013.01); *B32B 2307/414* (2013.01); *B32B 2307/554* (2013.01); *B32B 2307/718* (2013.01); *B32B 2307/7265* (2013.01); *B32B 2309/02* (2013.01); *B32B 2309/12* (2013.01); *B32B 2317/16* (2013.01); *B32B 2419/00* (2013.01); *B32B 2471/00* (2013.01); *B32B 2607/00* (2013.01)

(56) References Cited

U.S. PATENT DOCUMENTS

| | | |
|---|---|---|
| 7,431,979 B2 | 10/2008 | Grafenauer |
| 8,092,865 B2 | 1/2012 | Oldorff et al. |
| 8,257,791 B2 | 9/2012 | Grafenauer |
| 8,475,871 B2 | 7/2013 | Oldorff |
| 8,617,690 B2 | 12/2013 | Eisermann |
| 2004/0038062 A1 | 2/2004 | Wilson et al. |
| 2004/0123542 A1 | 7/2004 | Grafenauer |
| 2004/0134587 A1 | 7/2004 | Broberg et al. |
| 2007/0207296 A1 | 9/2007 | Eisermann |
| 2008/0292795 A1 | 11/2008 | Grafenauer |
| 2009/0139170 A1* | 6/2009 | Thiers ............... E04F 15/02 52/309.1 |
| 2009/0220730 A1 | 9/2009 | Price |
| 2009/0239027 A1 | 9/2009 | Oidorff et al. |
| 2010/0021699 A1 | 1/2010 | Engstrom et al. |
| 2011/0059239 A1 | 3/2011 | Oldorff |
| 2013/0126066 A1 | 5/2013 | Eisermann |

FOREIGN PATENT DOCUMENTS

| | | |
|---|---|---|
| DE | 202007008360 U1 | 8/2007 |
| EP | 1420126 A2 | 5/2004 |
| EP | 1493878 A1 | 1/2005 |
| EP | 1762400 A1 | 3/2007 |
| EP | 1507664 B1 | 7/2007 |
| EP | 1911578 A1 | 4/2008 |
| EP | 2030786 A2 | 3/2009 |
| WO | 9747834 A1 | 12/1997 |
| WO | 2004050280 A1 | 6/2004 |
| WO | 2007145572 A1 | 12/2007 |

OTHER PUBLICATIONS

Belgium Search Report for Belgium Patent Application No. 2009/ 0039, dated Dec. 5, 2009.

"Understanding Paper Weight," OKI Data Americas, Retrieved from www.oki.com/us/printing/support/understanding-paper-weight/ind . . . , Feb. 14, 2018, pp. 1-2.

"What is GSM or g/m2?," Printerbase, Retrieved from www.printerbase.co.uk/news/faqs/what-is-gsm-or-gm2/, Feb. 14, 2018, pp. 1-4.

* cited by examiner

FLOOR PANEL, METHODS FOR MANUFACTURING LAMINATE PANELS AND METHOD FOR TREATING MATERIAL SHEETS APPLIED HEREWITH

BACKGROUND OF THE INVENTION

1. Field of the Invention

This invention relates to a floor panel, to a method for manufacturing laminate panels, as well as to a method for treating material sheets applied therewith.

More particularly, the invention relates to floor panels, and in particular to laminate floor panels, of the type consisting at least or substantially of a substrate and a provided-thereon top layer on the basis of synthetic material, wherein said top layer comprises a printed decor and one or more material sheets provided with synthetic material, and wherein the floor panel is provided with a balancing layer at the underside of said substrate.

2. Related Art

It is known that laminate panels, more particularly laminate floor panels, can be manufactured in a variety of ways. For example, they may be realized by means of a DPL (Direct Pressure Laminate) technique, wherein material sheets provided with resin are brought into a press device and, by a press treatment performed by means of said press device, are bonded to the upper side of a substrate, such as a MDF or HDF board (Medium Density Fiberboard or High Density Fiberboard). Laminate floor panels may be realized, for example, also by means of an HPL (High Pressure Laminate) technique, wherein the material sheets provided with resin first are pressed together for forming a consolidated whole, which thereafter is provided as a top layer on a substrate, for example, is glued thereon.

Both in a DPL technique and in a HPL technique, the laminate panels comprise a printed decor, which usually is provided on at least one of the aforementioned material sheets and which determines the appearance of the decorative side of the panels. This may relate, for example, to a printed decor with a wood pattern.

SUMMARY OF THE DISCLOSURE

The present invention is particularly interesting for floor panels manufactured by means of a DPL technique.

In the meantime, it is well known to provide a balancing layer at the underside of DPL laminate panels, which balancing layer compensates possible residual tensions, which are present in the top layer as a result of the press treatment, such that a possible warping tendency of the obtained laminate panels as a result of tensile stresses in the top layer is counteracted as much as possible by an equal, however, oppositely directed warping tendency as a result of equally large tension stresses in the balancing layer.

According to the state of the art, a material sheet provided with resin is used as a backing layer, wherein this material sheet usually has a dry paper weight of 50 to 150 g/m$^2$. By means of the backing layer, moreover in most cases a waterproofing effect is obtained at the underside of the respective laminate panel. For a typical example of such laminate panel with a backing layer, reference is made to WO 97/47834.

The present invention aims at creating possibilities for restricting the cost price for manufacturing laminate panels. To this aim, the invention according to its first independent aspect relates to a laminate panel which is provided with an alternative balancing layer, to with a panel, preferably a floor panel, of the type consisting at least, however, preferably substantially, of a substrate and a provided-thereon top layer on the basis of synthetic material, wherein said top layer comprises a printed decor and one or more material sheets provided with synthetic material, wherein the floor panel is provided with a balancing layer at the underside of said substrate, with the characteristic that said balancing layer substantially consists of a synthetic material layer which is free from material sheets. Preferably, this relates to a laminate floor panel of the DPL type. By omitting a material sheet, such as a paper sheet, in the balancing layer, already an important saving of costs is obtained compared to floor panels or other laminate panels of the state of the art.

Contrary to the generally held view that the presence of a material sheet in the backing layer or balancing layer of a laminate panel or laminate floor panel is necessary, surprisingly it was found that a synthetic layer which is free from material sheets, more particularly free from paper sheets, may cause a sufficiently compensating warping tendency to keep the pressed whole flat or at least approximately flat. Moreover, it was found that by omitting material sheets in the balancing layer, also less synthetic material may be used than is usual, as a consequence of which a further saving of costs can be achieved. This is presumably due to the fact that no synthetic material is required for penetrating or impregnating the core of the previously present material sheet. Thus, the essence of the present invention according to its first aspect is in the surprising discovery that in the balancing layers of the state of the art, the material sheet and the synthetic material present in the core of this material sheet have a negligible influence on the warping tendency of the pressed whole and that the compensating effect substantially is achieved by the synthetic material which has not penetrated into the material sheet. An additional advantage of the possibility of applying less synthetic material is that the final product, in the case use is made of formaldehyde resins, shows less emissions of such formaldehyde.

The invention is preferably applied for floor panels having a porous substrate, such as floor panels having a substrate substantially or entirely consisting of MDF or HDF. Porous materials have the advantage that they allow the synthetic material of the balancing layer to penetrate at least partially into the surface layer of these materials, such that a good bond is obtained between the synthetic material of the balancing layer and the substrate, which as such may lead to a more efficient compensation of a certain warping of the substrate and the top layer.

In general, it is preferred that the synthetic material of the balancing layer penetrates at least partially into the substrate. Preferably, the substrate has at its underside a layer of at least 0.1 mm and still better at least 0.5 mm over which this synthetic material has penetrated into the substrate.

Preferably, substrates are used having a thickness situated between 5 and 15 mm, and in particular between 5 and 10 mm. Namely, it is in particular with such thin panels that applying a balancing layer is of essential importance.

The invention is particularly effective when the total weight of the material sheets located in the top layer, exclusive of synthetic material, is situated between 50 and 250 g/m$^2$.

As aforementioned, the invention also allows using less synthetic material in the balancing layer than it is the case with floor panels of the state of the art. Preferably, the balancing layer is made thinner than said top layer and/or comprises less synthetic material than the top layer. For example, in the balancing layer an amount of synthetic material can be used which is less than 75% or even less than 50% of the amount of synthetic material applied in the top layer, wherein these amounts are expressed in grams per square meter. Preferably, however, sufficient synthetic material is present such that the balancing layer forms a barrier against the penetration of moisture into the substrate.

Preferably, as the synthetic material, in the top layer as well as in the balancing layer, at least a thermo-hardening resin is applied, such as a melamine resin, a urea resin or another amino resin. For example, use can be made of melamine formaldehyde resin or urea formaldehyde resin, which possibly also comprises additives, such as plasticizer, liquefier, solvent, solidifier, anti-foaming agent, antistatic agent, such as a salt solution, or the like. Of course, it is not excluded to apply a thermoplastic resin. It is also not excluded to work with a blend of resins, such as a blend of melamine formaldehyde and urea formaldehyde resin, and/or to apply a different synthetic material in the top layer than in the balancing layer. It is noted that applying urea formaldehyde resin is approximately 50% cheaper than applying melamine formaldehyde resin. However, urea formaldehyde resin has the disadvantage that it is less water-resistant than melamine formaldehyde resin.

According to a deviating variant of the present invention, at least in the balancing layer and/or at least in the top layer a blend of the above-mentioned synthetic materials with natural resins, such as lignosulphonate, is applied. Lignosulphonate is approximately 75% cheaper than melamine formaldehyde resin, however, shows the disadvantage that it is not colorless. It is evident that in such case, where mixing ratios or amounts of synthetic material or resin are mentioned, this natural resin also has to be enclosed in the calculation.

In a preferred embodiment of the present invention, said printed decor is provided on one of said material sheets which are located in the top layer.

In respect to the material sheets which can be applied in the top layer, preferably use is made of one or more paper sheets. Herein, this may relate to a so-called decor paper, which either shows a print or a coloration, or to a so-called overlay, which substantially is translucent or transparent or can become this when such material sheet is pressed. When this relates to a decor paper, preferably a paper is applied having a weight between 60 and 150 grams per square meter, wherein for floor panels, the weight may be limited to 100 grams per square meter. The heavier papers may be used, for example, in furniture panels. When this relates to an overlay, preferably paper is applied having a weight between 15 and 40 grams per square meter, wherein with a paper of approximately 25 grams per square meter, an optimum is achieved between the strength of the paper and the possibly obtainable transparency thereof.

Preferably, the ratio between the total weight of synthetic material in the top layer to the total amount of paper in this top layer is situated between 150% and 350% and still better between 200% and 300%.

According to a second independent aspect, the invention aims at a method which is particularly suitable for manufacturing the panels, more particularly floor panels, of the first aspect, however, which also allows manufacturing other laminate panels. To this aim, the invention relates to a method for manufacturing panels, wherein these panels are of the type consisting at least, but preferably substantially, of a substrate, a provided-thereon top layer on the basis of synthetic material and a balancing layer on the basis of synthetic material provided at the underside of the substrate, wherein the method comprises at least the steps of:

providing one or more material sheets with synthetic material;

realizing the top layer by bringing at least said material sheets and the substrate in a press device, wherein these material sheets, by a press treatment performed by means of said press device, are bonded to the upper side of said substrate; and realizing a balancing layer at the underside of said substrate, with the characteristic that for realizing said balancing layer, prior to said press treatment, a synthetic material layer is formed at the underside of said substrate, wherein this synthetic material layer also is subjected to said press treatment and wherein the finally obtained balancing layer substantially consists of said synthetic material layer and is free from material sheets, in particular is free from absorptive material sheets, such as paper sheets. It is clear that the characteristics of the panels of the first aspect and the preferred embodiments thereof form corresponding preferred embodiments of the present method.

In that prior to the press treatment already a synthetic material layer is formed at the underside of the substrate, the substrate itself is effectively applied as a carrier for at least a portion and preferably for the total amount of the synthetic material required for the balancing layer. Hereby, it can be avoided that the press device needs to be equipped with particular application systems. Preferably, said synthetic material of the balancing layer is provided in liquid form on the underside of the substrate. As the synthetic material is provided in liquid form, a good contact with the substrate can be accomplished, wherein preferably also a penetration into the substrate is accomplished.

Preferably, the synthetic material of the balancing layer, when being applied, has a viscosity of more than 15 mPa·s, however, of less than 50 mPa·s. On the one hand, a high viscosity is advantageous for applying a relatively high amount of synthetic material, on the other hand, a low viscosity is advantageous for penetrating into a porous substrate, such as in the substrate also mentioned in connection with the first aspect. A good value for the viscosity is 20 mPa·s.

Preferably, the synthetic material layer, which will be a part of the balancing layer or will form this balancing layer, is at least partially dried prior to being subjected to the press treatment. For example, it may be dried to a residual moisture content of less than 10%. Drying until the surface is no longer sticky, may also be sufficient. To this aim, use can be made of hot-air ovens, microwave ovens or infrared radiators. According to another possibility, this synthetic material layer can be applied on warm substrates. In the case of MDF or HDF boards, this synthetic material layer, for example, can be applied at least partially while the boards are still warm as a result of their own manufacture. This latter possibility comprises important savings of energy.

For applying the synthetic material layer which forms the balancing layer, preferably use is made of an aqueous solution of said synthetic material, wherein this aqueous solution comprises between 30 and 60 percent of weight of water.

Preferably, the balancing layer comprises between 10 and 80 $g/m^2$ of said synthetic material.

As already mentioned in connection with the first aspect, the synthetic material of the balancing layer preferably substantially consists of a synthetic resin, preferably of melamine formaldehyde resin and/or urea formaldehyde resin. However, it is also possible working at least partially with natural resin, such as with lignosulphonate. Such natural resin may be applied in said material sheets of the top layer as well as in said balancing layer. Of course, the synthetic material and/or the natural resin also may comprise additives. Preferably, the balancing layer comprises at least an agent which promotes solidification of the synthetic material concerned.

As already mentioned above, the invention of the first and the second aspect is based on the insight that a material sheet, and in particular the resin which has penetrated into a material sheet, does not or almost not contribute to warping of the pressed floor panel. The inventors are of the opinion that the synthetic material or the resin which has penetrated into a material sheet has no function at all independently of the fact whether this relates to a material sheet for a balancing layer, a decor layer, a protective layer, such as an overlay, or another material sheet. According to its third independent aspect, the invention relates to a method which allows providing a synthetic material on one or both flat sides of a material sheet, more particularly an absorptive or porous material sheet, such as a paper sheet, without having this synthetic material completely saturating the paper sheet, however, still forms a synthetic material layer at least at the respective side. To this aim, the invention relates to a method for treating material sheets which can be applied for manufacturing laminate panels, wherein it is started from an absorptive material sheet, characterized in that the method comprises at least a first step, in which the absorptiveness of the material sheet is restricted, and comprises at least a second step in which synthetic material is provided on one or both flat sides of said material sheet. As the absorptiveness of the material is restricted, a synthetic material layer can be formed at the respective sides of the material sheet by means of a smaller amount of this synthetic material. It is clear that the method of the third aspect can provide a cost-friendly method. Preferably, paper sheets are treated by means of the method of the third aspect.

For performing said first step of the third aspect, in which the absorptiveness of the material is restricted, use can be made of various possible techniques.

According to a first possibility for the first step, the core of the material sheet, at least for a portion thereof, is impregnated with an inferior synthetic material. For example, at least in the core of the material sheet a resin can be applied which comprises at least urea formaldehyde and/or lignosulphonate, whereas in said second step at one or both sides a synthetic material layer is formed with a resin comprising, for example, at least melamine formaldehyde. Preferably, in the first step and/or in the second step, synthetic material is applied in a well-dosed manner. For applying the inferior synthetic material, the techniques, known as such, for impregnating material sheets, such as paper sheets, can be applied. For example, herein rolls, such as doctor rolls, can be applied. Preferably, at least between the first step and the second step an at least partial drying of the material sheet is performed. After completion of the process of applying synthetic material, i.e. after said second step and/or after possibly subsequent steps, preferably also a drying is performed, wherein preferably a residual moisture content of less than 10% is obtained, for example, a residual moisture content of approximately 6%.

In the case that at least partially melamine formaldehyde resin is used, the resin applied in the second step preferably comprises more melamine than the resin applied in the first step.

According to a second possibility for the first step, at one or both flat sides of the material sheet a small amount of synthetic material is applied, which, preferably immediately thereafter, is fixated on the surface of the material sheet, for example, in that the application thereof is immediately followed by a preferably forced, at least partial and preferably complete drying, preferably by means of a hot-air oven or a microwave oven. As a synthetic material layer is formed at the surface of the respective material sheet, a barrier is formed against the penetration of the synthetic material layer which is applied in the second step. Herein, the synthetic material which is applied in the first step may or may not be the same which is applied in the second step. Preferably, at least the synthetic material which is applied in the second step comprises melamine formaldehyde and/or urea formaldehyde and/or lignosulphonate.

For performing the second step, the methods known from the state of the art may be used, such as, for example, applying synthetic material by means of rolls, spraying devices and/or immersion devices. Preferably, in this second step the synthetic material is deposited in a well-dosed manner. To this aim, for example, doctor rolls may be applied.

It is evident that the invention also relates to material sheets which are obtained by means of a method with the characteristics of the third aspect, and relates to a laminate panel comprising such material sheet.

It is noted that applying one or more of the material sheets treated according to the method of the third aspect in the top layer of a laminate panel also results in that the possible balancing layer may comprise less resin, which as such again results in cost savings. Of course, it is possible to apply in such case the method of the second aspect and to obtain a panel with the characteristics of the first aspect.

BRIEF DESCRIPTION OF THE DRAWINGS

With the intention of better showing the characteristics of the invention, hereafter, as an example without any limitative character, some preferred embodiments are described, with reference to the accompanying drawings, wherein:

FIG. 6 represents a material sheet obtained by means of a method with the characteristics of the third aspect of the invention.

DETAILED DESCRIPTION OF PREFERRED EMBODIMENTS OF THE INVENTION

Figure 1:
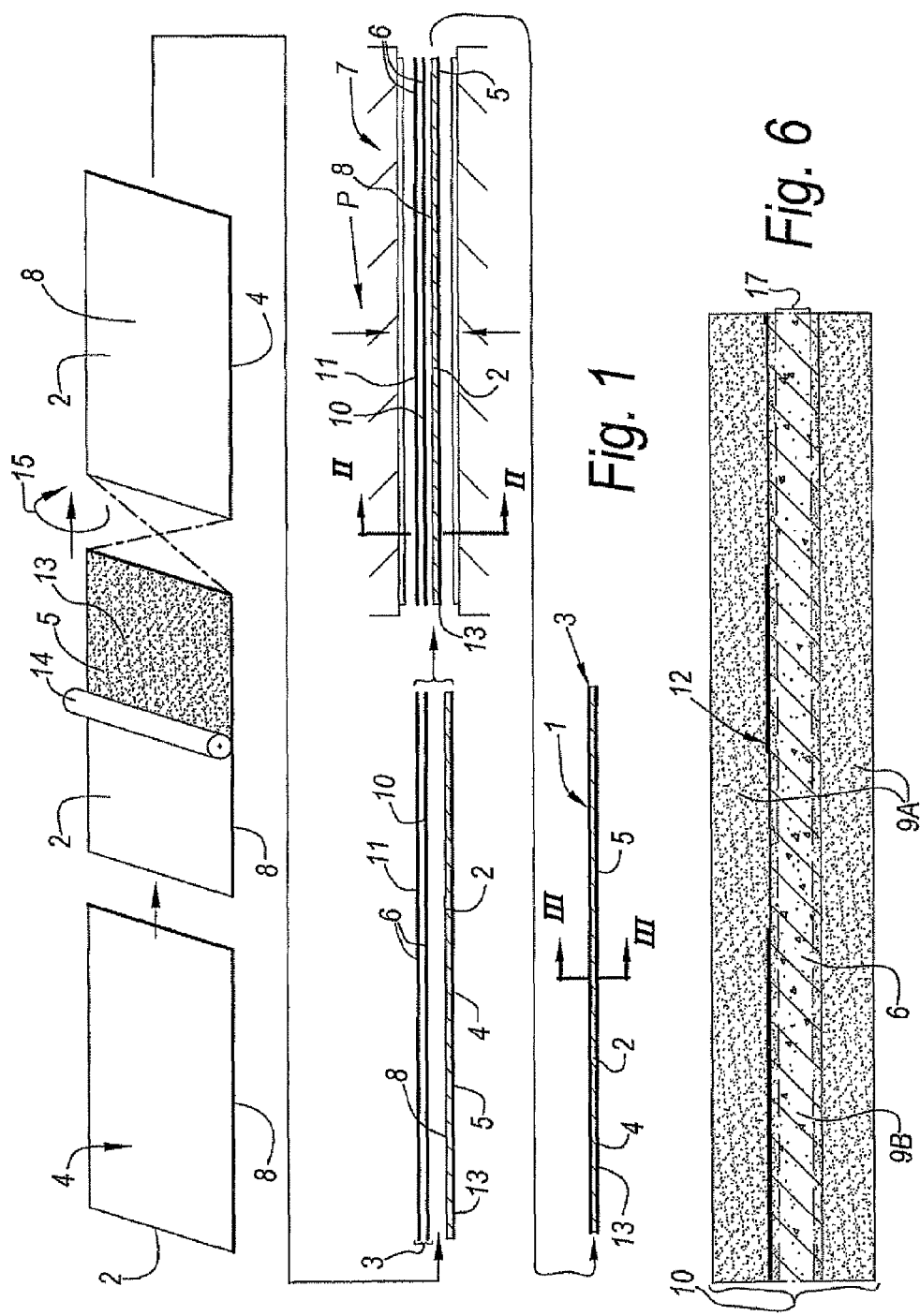
FIG. 1 schematically represents some steps of a method with the characteristics of the second aspect of the invention.

FIG. 1 represents a method for manufacturing laminate panels 1. Herein, this relates to panels 1 which are manufactured substantially by means of a DPL technique and which are of the type substantially consisting of a substrate 2, a provided-thereon top layer 3 and a balancing layer 5 located at the underside 4 of the substrate 2. For realizing the top layer 3, at least a number of material sheets 6 and the substrate 2 together are brought into a press device 7, wherein said material sheets 6 are bonded to the upper side 8 of said substrate 2 by means of a press treatment P performed by means of said press device 7.

Figure 2:
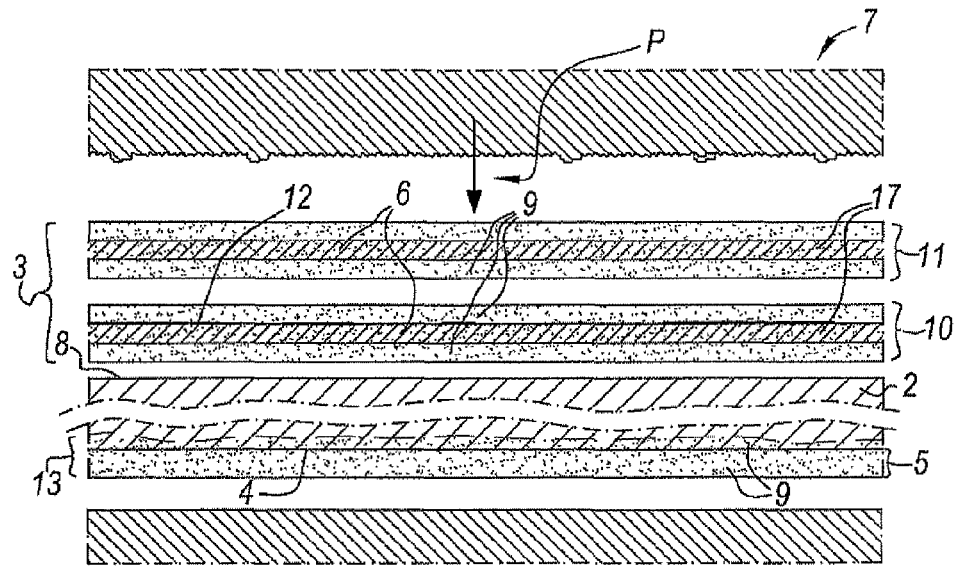
FIG. 2 at a larger scale represents a cross-section according to the line II-II indicated in FIG. 1.

As FIG. 2 clearly shows, the material sheets 6, which are incorporated into the top layer 3, are provided with synthetic material, more particularly resin 9, in a preceding step, which is not represented here. Herein, the resin 9 is situated both in the cores of the respective material sheets 6, in this case, paper sheets, and at the surface of at least one of the flat sides, and preferably, such as here, at both flat sides of these material sheets 6. This is a consequence of the absorptiveness of the paper sheets.

In the example of FIG. 2, the material sheets 6 provided with resin 9 relate to, on the one hand, an impregnated printed paper sheet which serves as the so-called decor layer 10, and, on the other hand, an overlay or protective layer 11 situated above this printed paper sheet. This overlay as such consists of an impregnated paper sheet, which becomes transparent after being pressed. The print 12 provided on the decor layer 10 may show, for example, a wood pattern.

Figure 3:
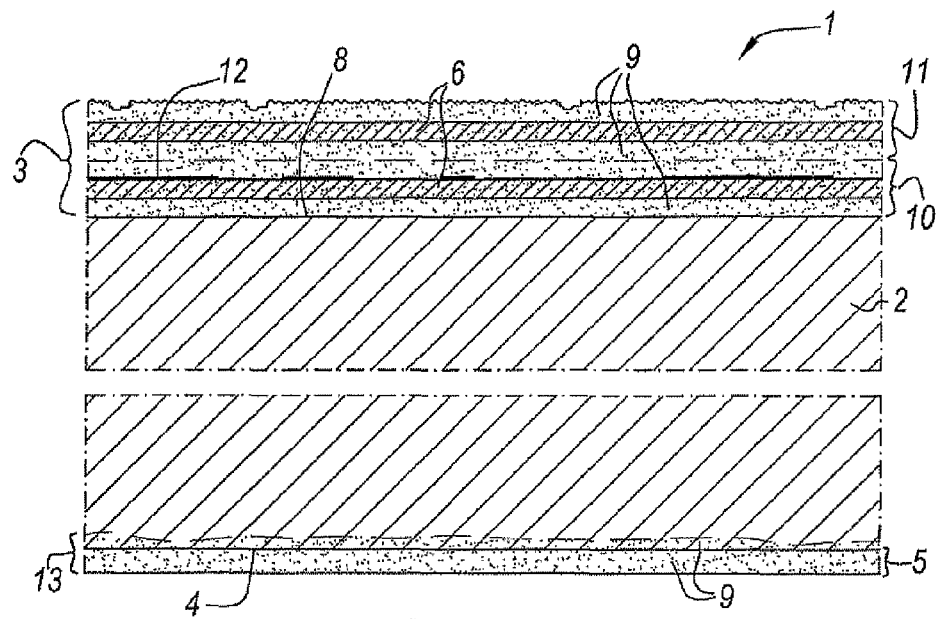
FIG. 3, at a similar scale as FIG. 2, represents a cross-section according to the line III-III indicated in FIG. 1.

FIG. 3 clearly shows that the obtained laminate panels 1 are provided with a balancing layer 5 at the underside, which balancing layer serves for at least partially compensating a possible warping of the pressed whole. Such warping occurs because the material of the top layer 3, in particular the respective synthetic material or resin 9, and the substrate 2, for example, a substrate 2 consisting of a MDF or HDF board, react differently to the press treatment P. The top layer 3 hardens under the influence of the high press temperatures, for example, 200° C., and thereby has the tendency to shrink; the MDF or HDF substrate 2, however, hardly undergoes any dimensional deformation at such temperatures. The consequence thereof is that strong tension stresses are created in the top layer 3, which in turn may lead to warping of the substrate 2, wherein this warping is hollow at the side of the substrate 2 provided with the top layer 3. By applying a balancing layer 5, a similar tension stress can occur at the other flat side, which can at least partially compensate the tension stresses occurred in the top layer 3.

The balancing layer 5 of the laminate panel 1, as represented in FIG. 3, substantially consists of a synthetic material layer 13, which is free from material sheets 6, such as paper sheets. It is clear that the laminate panel 1 represented here shows, amongst others, the characteristics of the first aspect of the invention.

FIG. 1 represents that this balancing layer 5 is realized by forming, prior to said press treatment P, a synthetic material layer 13 at the underside 4 of said substrate 2. To this aim, synthetic material, more particularly resin 9, is applied on at least one flat side of the substrate 2, for example, as represented here, by means of one or more rolls 14. Optionally, a drying treatment can be performed on the applied synthetic material layer 13, such that it becomes less sticky at its surface and/or even completely looses its stickiness at this surface. Such drying treatment allows a simpler further processing of the substrate 2 provided with the synthetic material layer 13. As is also represented by the arrow 15, the side 4 of the substrate 2 which is intended for being provided with the balancing layer 5 during the application of the synthetic material layer 13, can be directed upward, and the substrate 2 with the provided-thereon and possibly at least partially dried synthetic material layer 13 can be turned, such that the side 4 with the balancing layer 5 is directed downward during the further treatments.

As FIG. 2 represents, the synthetic material layer 13 possibly can penetrate up into the substrate 2, such that a good adherence is obtained between the synthetic material layer 13 and the substrate 2. This figure also shows that the synthetic material layer 13, which is provided at the underside 4 of the substrate 2, also is subjected to said press treatment P, where it then preferably hardens completely.

Figure 4:
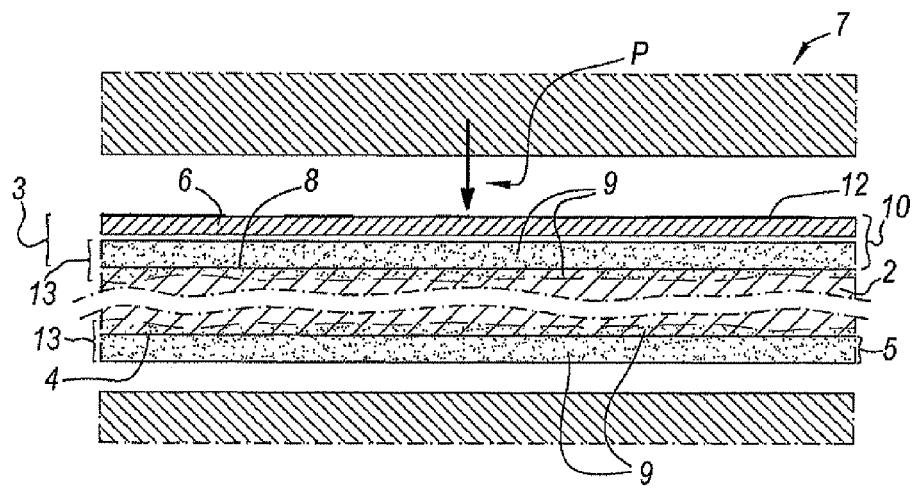
FIG. 4, in a similar view as that of FIG. 2, represents a variant.

FIG. 4 represents a case wherein at both sides of the substrate 2, prior to the press treatment P, a synthetic material layer 13 is provided, which is free from material sheets, and wherein each time a partial penetration of the synthetic material or the resin 9 into the substrate 2 is obtained. In this example, however, the decor layer 10 is not provided with resin 9. During the press treatment P, the resin 9, which is located at the decor side or upper side 8 of the substrate 2, will penetrate into the absorptive material sheet 6 of the decor layer 10, or the so-called decor paper, and in this manner cause a bond between the decor layer 10 and the substrate 2.

Figure 5:
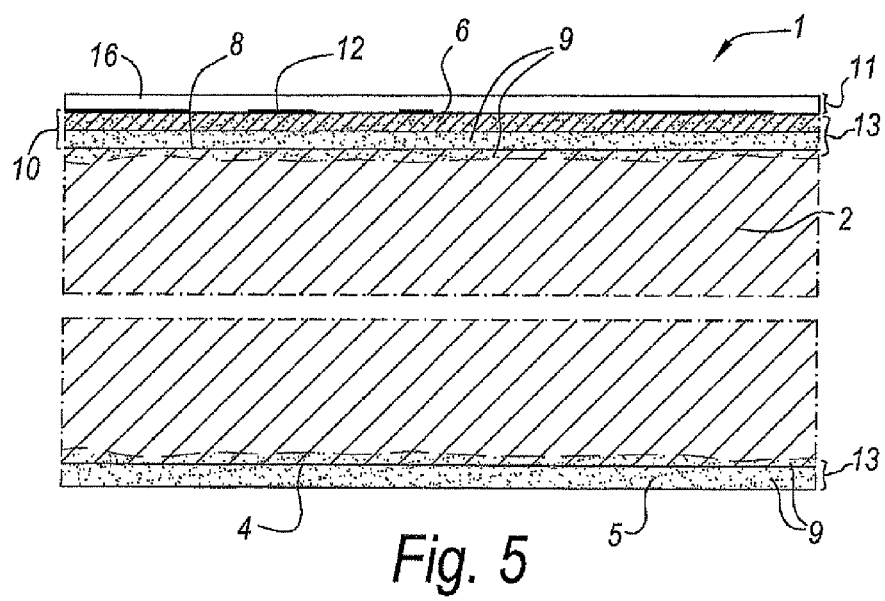
FIG. 5, in a similar view as that of FIG. 3, represents the variant of FIG. 4.

The result of this press treatment P is represented in FIG. 5, wherein in a step subsequent to the press treatment P one or more transparent or translucent lacquer layers 16 are provided above the decor layer 10. In this manner, these lacquer layers 16 form a protective layer 11 for the print 12.

FIG. 6 represents another material sheet 6, more particularly an absorptive paper sheet, which is provided with a print 12 and which is obtained by means of a method with the characteristics of, amongst others, the third aspect of the invention. Such material sheet 6 can be applied, for example, as a decor layer 10 in a laminate panel 1, such as in a laminate floor panel. The represented material sheet 6 is obtained by means of a method which comprises at least two steps. In a first step, the absorptiveness of the material sheet 6 is restricted, in that a core impregnation 17 is performed with an inferior resin 9B, such as a resin 9B comprising urea formaldehyde. In a second step, synthetic material 9A, such as melamine formaldehyde resin, was applied on both flat sides of the material sheet 6. In the figure, it is clearly shown that the resin 9A, which is provided in the second step, penetrates only over a limited distance into the paper sheet or material sheet 6, and that by means of this resin 9A substantially synthetic material layers are formed at the surface of the paper sheet.

According to a not represented variant of FIG. 6, the inferior resin forms the core impregnation as well as the synthetic material layer at the surface of only one side of the material sheet, whereas the synthetic material layer at the surface of the other side consists of the better resin. In the case of a decor layer, the side with the surface layer of inferior resin preferably relates to the side averted from the print.

With the intention of further illustrating the invention, here below, without any limitative character, some more exemplary embodiments are listed.

Example 1

The example describes a practical embodiment of the method of the second aspect of the invention, by which in this case a panel with the characteristics of the first aspect is obtained.

A HDF board is covered at both flat sides with an aqueous solution of melamine formaldehyde resin. The solution comprises 60 percent by weight solid matter of resin. The solution is applied per side with a rate of 37 g/m². The thus treated HDF board is dried during 2 minutes at 130° C. in a hot-air oven. The surface of the deposited resin layer is no longer sticky.

An untreated decor paper is put on the upper side of the board, the whole is brought into a press device which opens and closes (a so-called short-cycle press) and is pressed by means of an unstructured matte press plate during 15 seconds at a temperature of 200° C. and a pressure of 45 bar. A good adherence of the decor paper on the MDF substrate is obtained and a small, however, acceptable warping of the board can be observed. The warping is hollow at the decor side of the board, which indicates a slight insufficiency of compensating warping tendency of the balancing layer.

Example 2

The same manner of proceeding is maintained as in example 1; however, now also an overlay paper provided with melamine formaldehyde resin is applied above the untreated decor paper. A similar result for adherence and warping is obtained.

Example 3

The same manner of proceeding is maintained as in example 2, however, now instead of 37 g/m$^2$ of the aqueous solution, 74 g/m$^2$ of the aqueous solution are applied. The obtained adherence of the top layer on the substrate is good, and moreover no more warping of the pressed board is observed.

In comparison, it is noted that a backing layer from the state of the art typically is provided on the basis of a 70 g/m$^2$ paper, upon which 165 g/m$^2$ of a 60% resin solution is applied. Therefore, it is clear that by means of the invention the material sheet, more particularly the paper, of the backing layer as well as a considerable amount of resin can be economized. Even if one proceeds as in example 2, however, wherein instead of 37 g/m$^2$ of the aqueous solution up to 120 g/m$^2$ are applied, still important cost savings are obtained. These higher amounts can be applied, for example, when the decor paper of the examples still is treated by also providing it with resin, more particularly impregnating it with resin.

Of course, it is possible that the methods of the invention and the pertaining examples thereof are applied for manufacturing larger laminate boards, which still have to be subdivided into a plurality of smaller panels having approximately the final dimensions of the respective laminate panel to be manufactured. This possibility is preferred when the final laminate panels have a surface of less than 0.5 m$^2$. This is the case, for example, with most laminate floor panels, wall panels and ceiling panels.

It is also possible that the examples are performed by means of treated, preferably provided with synthetic material, decor papers, wherein then resin is deposited on the substrate preferably at the side of the balancing layer.

The laminate panel obtained in the aforementioned example 1 can further be provided with a protective layer, such as a lacquer layer, at its decorative side or decor side. It is noted that a method wherein decor paper is not or almost not provided with synthetic material and is pressed on a substrate by means of a resin-containing intermediate layer, is known as such, for example, from EP 1 507 664. However, it has not been known yet in such method to finish the decor at least with a transparent or translucent lacquer layer, for example, with a wear-resistant lacquer, for example, corundum-containing lacquer. This may relate to an UV-hardening or electron beam-hardening lacquer. Possibly, several lacquer layers may be used, or one or more other intermediate layers, such as layers consisting of melt glue. Preferably however, the upper finishing layer consists of said transparent or translucent lacquer layer, which possibly is made wear-resistant or scratch-resistant. A method in which such finishing is applied by means of an untreated or almost untreated decor paper, which is pressed by means of a resin-containing intermediate layer, as such forms an independent aspect of the invention. This independent fourth aspect of the invention may also be described as a method for manufacturing laminate panels of the type consisting at least, however, preferably substantially, of a substrate and a provided-thereon top layer, wherein the method comprises at least the steps of:

providing a synthetic material-containing layer on the substrate, wherein this synthetic material-containing layer preferably is free from material sheets;

providing on said synthetic material-containing layer a, preferably absorptive, material sheet showing a printed decor;

performing, in a press device, a press treatment at least on the substrate, the synthetic material-containing layer and the absorptive material sheet such, that these are bonded to each other;

characterized in that above the printed decor, one or more transparent or translucent layers are provided, preferably after said press treatment is performed. It is clear that as the synthetic material, the synthetic materials applied in the remaining aspects can be used, and that as lacquers the also above-mentioned wear-resistant UV- or electron beam-hardening lacquers can be applied. As the material sheet, preferably a printed paper sheet is applied. It is also noted that providing the lacquer layer can also be performed after the pressed whole has been divided into smaller panels.

For providing the synthetic material layers at the underside and/or the upper side of the substrates, any technique can be applied. Preferably, however, no carrier sheet is used during this application process. For example, roller devices and/or spraying devices and/or atomization devices and/or pouring curtains and/or spreading devices can be used, which provide the synthetic material directly on the substrate. Preferably, the respective synthetic material layer is provided in a dosed manner. Possibly, dosing may be performed by removing an excessive amount of synthetic material after application. When using hardening agents, preferably a separate application system is used for the hardening agent, and/or a mixing device, which, for example, is situated close to the application system, such that the risk that the synthetic material hardens on or in the application system is minimized and/or the lifetime of the synthetic material is extended.

It is clear that the FIGS. 4 and 5 of the detailed description also illustrate some steps in a method with the characteristics of the herein above-mentioned fourth aspect of the invention.

It is noted that according to the first and the second aspect of the invention the balancing layer is free from material sheets and that therefore, it is thus not excluded that at the underside of the substrate, at the one or the other side of the synthetic material forming the actual balancing layer, also one or more material sheets are present, which, however, have no appreciable balancing effect. For example, a cardboard layer may be present at the underside of the panel, which has a certain noise-absorbing effect. Preferably, however, the underside of the substrate is free from such material sheets, more particularly paper layers.

It is noted that the methods of the present invention are intended in particular for manufacturing laminate floor panels, or material sheets which can be applied when manufacturing such floor panels. Preferably, this relates to laminate floor panels manufactured by means of a DPL technique. Further, it is noted that the invention also relates to the products which are obtained or can be obtained by means of a method with the characteristics of one or more of the aforementioned aspects.

Further, it is also noted that the herein above-mentioned balancing layers, instead of consisting substantially of resin, for example, also may consist substantially of a noise-absorbing synthetic material layer, such as a polyurethane-containing synthetic material layer. Applying a polyurethane-containing material for realizing a synthetic material layer at the underside of a coated panel as such forms an independent fifth aspect of the present invention, independently of the fact whether this synthetic material layer has any balancing effect or is or is not free from material sheets. To this aim, the invention relates to a floor panel of the type consisting at least of a substrate and a provided-thereon top layer with a printed decor, wherein the floor panel, at the underside of said substrate, is provided with a backing layer, with the characteristic that said backing layer comprises polyurethane. Preferably, the floor panel of the fifth aspect relates to a floor panel with a printed decor which is obtained by performing a print directly on the panel, such as a print obtained by means of a digital printing technique, for example, inkjet printing, wherein this print is performed on one or more primer layers already present on the substrate, wherein the obtained print preferably is finished further by means of one or more transparent or translucent finishing layers. Preferably, for the finishing layers at least one lacquer layer is applied, such as a UV-hardening or electron beam-hardening lacquer layer. Preferably, for the backing layer also a lacquer layer is applied, wherein this lacquer layer then comprises polyurethane. Preferably, said polyurethane-containing material is provided on the underside of the substrate in liquid form, wherein it then foams or is foamed up. Preferably, foaming takes places in a controlled manner, for example, in a mold or in a press device.

The present invention is in no way restricted to the herein above-described embodiments; on the contrary may such floor panels and methods be realized according to various variants, without leaving the scope of the present invention.

The invention claimed is:

1. Floor panel consisting at least of a substrate and a top layer located on a first surface of the substrate;
    wherein said top layer comprises a printed decor and synthetic material, and wherein the floor panel is provided with a balancing layer immediately located adjacent to an underside defined as a second side of said substrate opposite the first surface, the substrate being porous and the synthetic material of the balancing layer penetrating at least partially into the substrate;
    wherein said balancing layer substantially consists of a synthetic material layer which is free from material sheets.

2. The floor panel of claim 1, wherein the floor panel is a laminate floor panel of the DPL type.

3. The floor panel of claim 1, wherein said substrate substantially consists of MDF or HDF.

4. The floor panel of claim 1, wherein the total weight of material sheets, which are located in the top layer, is situated between 50 and 250 g/m$^2$.

5. The floor panel of claim 1, wherein the balancing layer is made thinner than said top layer.

6. The floor panel of claim 1, wherein the balancing layer comprises less synthetic material than said top layer.

7. The floor panel of claim 1, wherein as the synthetic material, at least one thermo-hardening resin is applied in the top layer as well as in the balancing layer.

8. The floor panel of claim 1, wherein said printed decor is provided on material sheets located in the top layer.

9. The floor panel of claim 1, wherein synthetic material of the balancing layer penetrates at least 0.1 mm into the substrate.

10. The floor panel of claim 9, wherein the synthetic material of the balancing layer penetrates at least 0.5 mm into the substrate.

11. The floor panel of claim 1, wherein the synthetic material of the top layer and the synthetic material layer of the balancing layer are made of melamine resin.

12. The floor panel of claim 11, wherein the melamine resin is a melamine formaldehyde resin.

13. Floor panel consisting at least of a substrate and a top layer located on a first surface of the substrate;
    wherein said top layer comprises a printed decor and synthetic material, and wherein the floor panel is provided with a balancing layer immediately located adjacent to an underside defined as a second side of said substrate opposite the first surface, the substrate being porous and the synthetic material of the balancing layer penetrating at least partially into the substrate;
    wherein said balancing layer substantially consists of a synthetic material layer which is free from material sheets;
    wherein the floor panel is a laminate floor panel of the DPL type;
    wherein said substrate substantially consists of MDF or HDF;
    wherein the total weight of material sheets, which are located in the top layer, is within the range between 50 and 250 g/m$^2$;
    wherein the balancing layer is made thinner than said top layer;
    wherein the balancing layer comprises less synthetic material than said top layer;
    wherein as the synthetic material, at least one thermo-hardening resin is applied in the top layer and in the balancing layer;
    wherein said printed decor is provided on material sheets located in the top layer.

14. The floor panel of claim 13, wherein synthetic material of the balancing layer penetrates at least 0.1 mm into the substrate.

15. The floor panel of claim 14, wherein the synthetic material of the balancing layer penetrates at least 0.5 mm into the substrate.

16. The floor panel of claim 13, wherein the synthetic material of the top layer and the synthetic material layer of the balancing layer are made of melamine resin.

17. The floor panel of claim 16, wherein the melamine resin is a melamine formaldehyde resin.

* * * * *